Dec. 17, 1968         R. A. CHARTIER           3,416,187
                   PATTY MOLDING MACHINE
Filed April 18, 1966                      4 Sheets-Sheet 1

INVENTOR.
RENE A. CHARTIER
BY E. H. Schmidt

ATTORNEY.

Dec. 17, 1968 R. A. CHARTIER 3,416,187
PATTY MOLDING MACHINE
Filed April 18, 1966 4 Sheets-Sheet 2
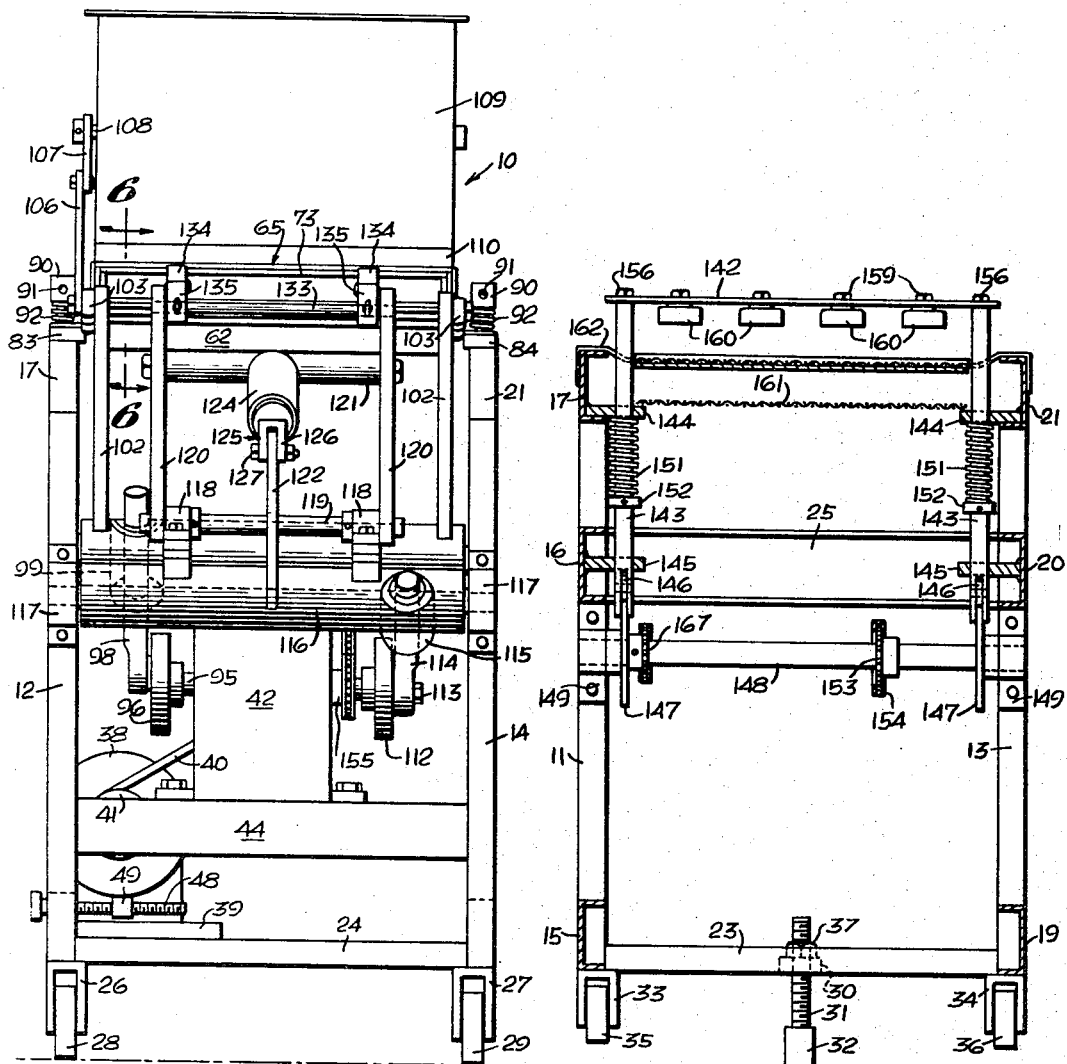
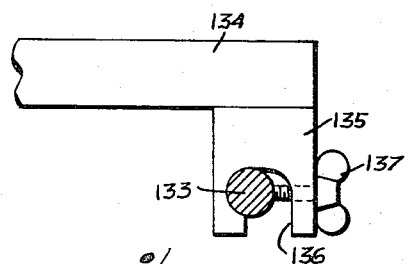
INVENTOR.
RENE A. CHARTIER
BY E. H. Schmidt
ATTORNEY.

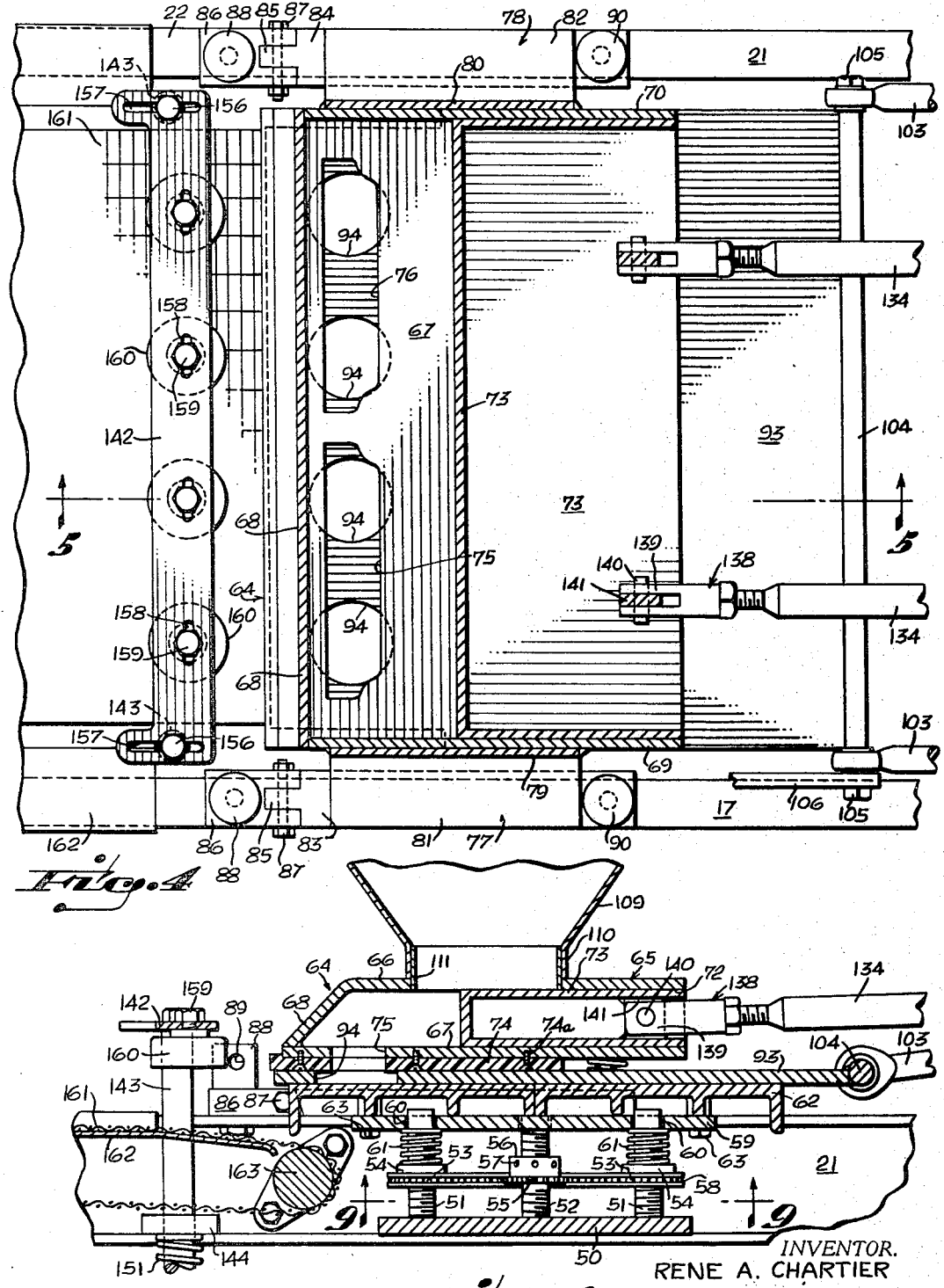

Dec. 17, 1968 R. A. CHARTIER 3,416,187
PATTY MOLDING MACHINE
Filed April 18, 1966 4 Sheets-Sheet 4

INVENTOR.
RENE A. CHARTIER

BY E. H. Schmidt

ATTORNEY.

United States Patent Office 3,416,187
Patented Dec. 17, 1968

3,416,187
PATTY MOLDING MACHINE
Rene A. Chartier, 4361 E. 10th Lane,
Hialeah, Fla. 33013
Filed Apr. 18, 1966, Ser. No. 543,388
2 Claims. (Cl. 17—32)

ABSTRACT OF THE DISCLOSURE

A patty molding machine comprising a reciprocable mold plate having openings defining the shape and thickness of patties to be molded and a reciprocating piston for forcing the food to be molded from a pressure chamber through communicative openings and into the mold openings with automatically controlled pressure afforded by a spring-controlled override mechanism, the mold plate being reciprocable in sliding movement out of communication with the food pressure chamber in such timed relation with respect to the reciprocating piston as to remove patties of uniform density and shape from the food pressure chamber for deposit on a conveyor.

---

This invention relates generally to food processing machines, and is directed particularly to an improved machine for automatically molding ground meat, fish and the like moldable food products into patties, sticks or other individual portions of a particular shape and size.

Food molding machines, particularly machines for automatically molding hamburger patties and so-called fish "sticks" are known. Such machines for this purpose as have heretofore been devised, however, are very complicated, expensive, and difficult to clean and maintain.

It is accordingly the principal object of this invention to provide an improved and simplified machine for automatically molding patties and the like from moldable food products, which will be of greatly simplified construction, comprised of comparatively few parts, which can readily be dissassembled for easy cleaning, and which is inexpensive to manufacture.

Another object is to provide an automatic molding machine of the character described which can readily be adjusted to mold food patties or portions of various shapes, selectively, at speeds up to about 30,000 units an hour for the smaller sizes.

A more particular object of this invention is to provide a patty molding machine of the character described comprising a reciprocable mold plate having openings defining the shape and thickness of the patty to be molded, and a reciprocating piston for forcing the food to be molded from a pressure chamber through communicative openings and into the mold openings with controlled pressure the mold plate being reciprocable in sliding movement out of the communication with the food pressure chamber in such timed relation with respect to the reciprocating piston as to remove patties of uniform density and shape from the food pressure chamber for deposit on a conveyor.

Still another object is to provide a food molding machine of the above nature including mechanism permitting easy replacement of the mold plate and piston when changing from one patty size and or shape to another, and further including means for automatically seating the mold plate and pressure chamber in firm face-to-face abutting relation at their mutually sliding surfaces to minimize leakage from the pressure chamber.

Yet another object is to provide a molding machine of the character described including a self-feeding hopper, and conveyor mechanism for carrying the patties produced to a work table or other conveyor or machine for further processing, whereby the molding machine will continue to operate with minimum supervision as long as food to be molded is supplied to the hopper.

Other objects features and advantages of the invention will be apparent from the following description when read with reference to the accompanyings drawings. In the drawings, wherein like reference numerals denote corresponding parts throughout the several views:

FIG. 2 is a rear elevational view of the machine;

FIG. 3 is a vertical cross-sectional view taken along the line 3—3 of FIG. 1 in the direction of the arrows;

FIG. 4 is a horizontal cross-sectional view taken along the line 4—4 of FIG. 1 in the direction of the arrows;

FIG. 5 is a vertical cross-sectional view taken along the line 5—5 of FIG. 4 in the direction of the arrows;

FIG. 6 is a partial cross-sectional view taken along the line 6—6 of FIG. 2 on an enlarged scale and illustrating the mechanism for removable attachment of the piston link members to their operating mechanism;

Figure 1:
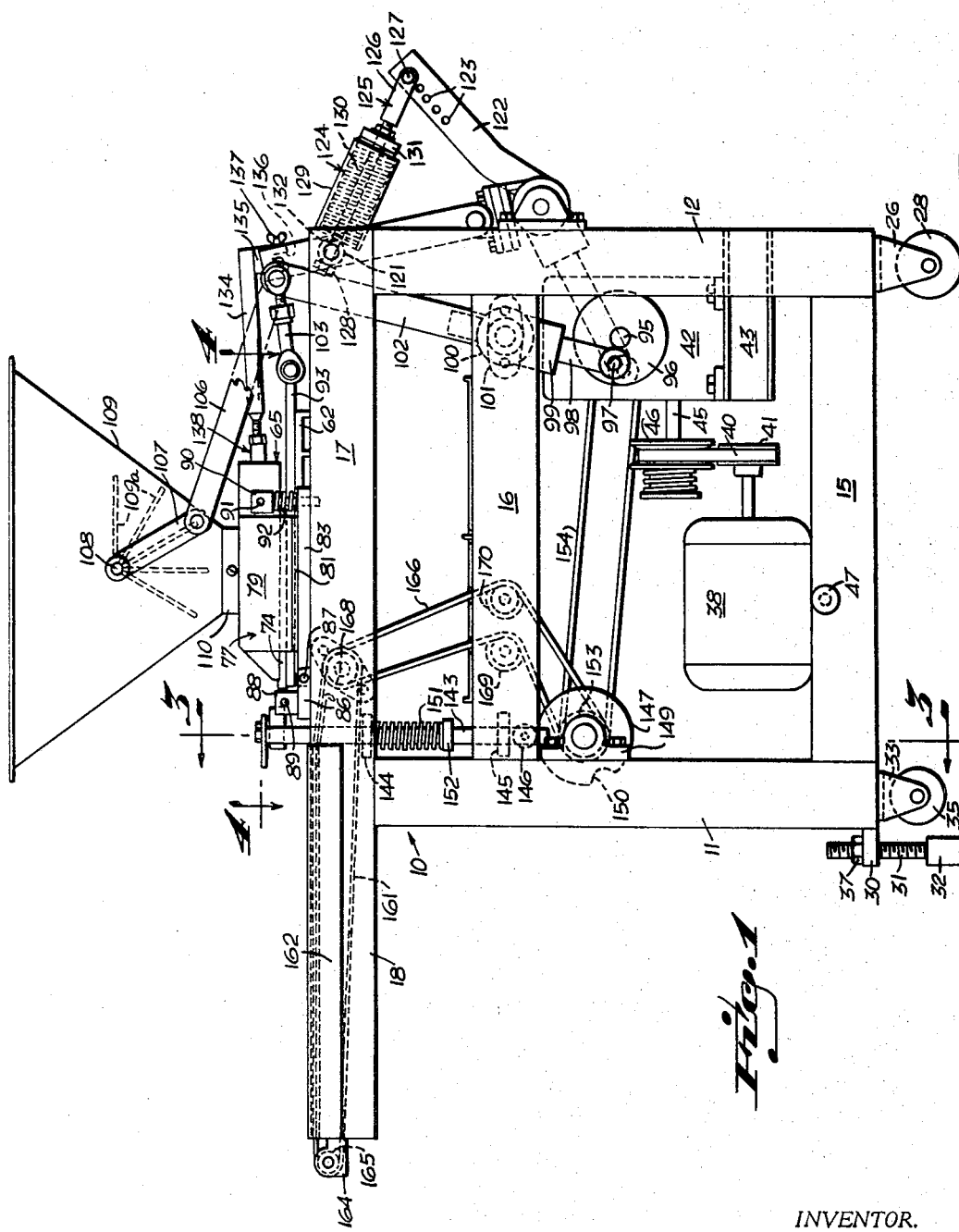
FIG. 1 is a side elevational view of a patty molding machine embodying the invention.

Referring now in detail to the drawings, 10 designates, generally, a patty molding machine embodying the invention, the same comprising a rectangular, box-like framework of welded channel iron members including front and back upright channel members 11, 12, respectively, at one side, and front and back upright channel members 13, 14 respectively, at the other side. The channel members 11, 12 are secured in spaced, parallel, front-to-back relation by a bottom transverse member 15, and intermediate transverse member 16 and a top transverse member 17. The top transverse member 17 projects forwardly as at 18 to provide a supporting framework for the conveyor mechanism transporting formed patties from the machine, as is hereinafter described.

The front and back upright channel members 13, 14 of the machine framework are similarly secured in spaced, parallel front-to-back relation by a bottom transverse member 19, an intermediate transverse member 20 and a top transverse member 21. The top transverse member 21 similarly projects forwardly, as at 22, to provide the supporting framework for the above-mentioned conveyor mechanism.

The framework side structures described above are held in spaced, parallel relation at the bottom by a front transverse channel member 23 and a rear transverse channel iron member 24. A second front, transverse channel iron member 25, fixed intermediate the ends of the front members 11, 13, and other support mechanism hereinafter descirbed, hold the framework side structures in relatively fixed relation. The rear lower corners of the framework structures are provided with brackets 26, 27 journalling wheels 28, 29, respectively, to facilitate moving the machine from place to place. The front transverse channel iron member 23 has welded thereto and projecting outwardly thereof, at a central position therealong, a lug member 30 bored and threaded to adjustably receive the threaded stud portion 31 of a front support jack 32 for adjusting the height of the front of the machine. The front lower corners of the framework structure are also provided with brackets 33, 34 journalling wheels 35, 36, respectfully, smaller in diameter than the rear wheels 28, 29. As illustrated in FIGS. 1 and 3, when in use the front end of the machine will normally be supported in adjusted position by the support jack 32 with the wheels 35, 36 off the floor. A lock nut 37 serves to secure the support jack 32 in adjusted position.

As illustrated in FIG. 1 and 2, an electric motor 38 supported on a platform 39 secured to the side bottom member 15 and to the front transverse member 23 of the framework is utilized to power the machine. A drive belt 40 transmits power from the pulley 41 on the output shaft of the motor 38 to a speed reduction gear box 42 supported on channel bars 43 extending inwardly of a transverse channel member 44 welded between the back upright channel members 12, 14 near the lower ends thereof. The input or driven shaft 45 of the gear box 42 is fitted with a variable speed transmisison pulley 46 of the type wherein transmission ratio is controlled by the amount of tension applied by the drive belt 40, and control is effected by hand wheel 47, having a threaded shaft 48 journalled in the bottom transverse member 15 and threadingly engaged in a lug member 49 fixed with respect to the motor, the motor being mounted for transverse sliding movement along its support platform 39. Thus, as illustrated in FIGS. 1 and 2, as the motor is moved laterally away from the gear box 42, increased tension thereby imparted to the drive belt 40 serves to spread the sheave portions of the variable speed pulley 46 fitted to the input shaft of said gear box to increase speed transmission ratio to the input thereof.

Figure 9:
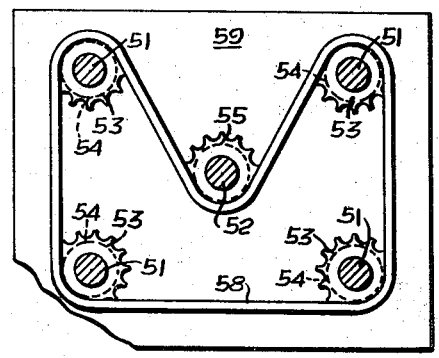
FIG. 9 is a horizontal cross-sectional view taken along the line 9—9 of FIG. 5 in the direction of the arrows and illustrating details of the bed plate support mechanism.
Figure 8:
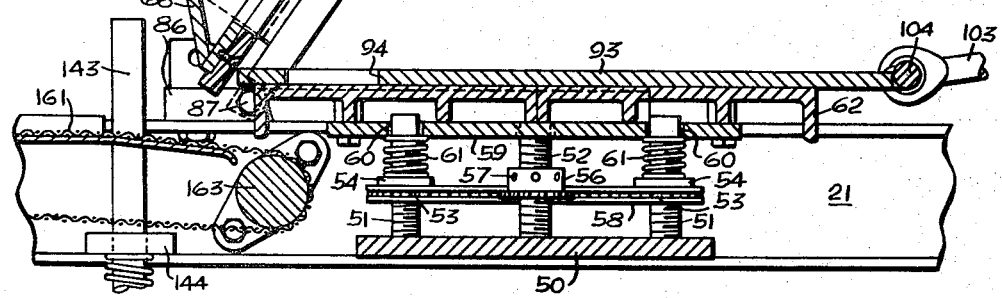
FIG. 8 is a cross-sectional view similar to those of FIGS. 5 and 7 but illustrating the molding head swung up and away from the molding table of the machine for cleaning.

Means is provided for adjustably and resiliently supporting the molding mechanism at the top of the machine framework. To this end, a rectangular base plate 50 is fixed, as by welding, between the lower flanges of the opposed top transverse members 17 and 21 of said framework (see FIG. 5). Fixed to and extending upwardly from the base plate 50 are five threaded posts, four posts 51 near the corners and one post 52 at the center of said base plate. The corner threaded posts 51 have fitted thereon internally-threaded sprockets 53 each of which is formed at the upper side with an annular hub portion 54. The center threaded post 52 has fitted thereon an internally-threaded sprocket 55 integrally formed with an upwardly-extending hub portion 56 of greater length than the hub portions 54 of the sprockets 53. The hub portion 56 is provided with radial bores 57 equidistantly spaced about the periphery thereof for engagement with a spanner tool for adjustment, as is hereinbelow described. A drive chain 58 interconnecting the sprockets 53 and 55 as illustrated in FIG. 9 serves to move the sprockets 53 up or down in unison as the adjustable sprocket 55 is turned with a spanner tool. It is to be noted that the central post 52 is threaded in the opposite direction to that of the corner posts 51 so that it will move in the same direction as that of said corner posts when turned.

Horizontally positioned in spaced relation above the base plate 50 is a support plate 59 having openings 60 through which the upper ends of the posts 51 and 52 project. Helical compression springs 61 circumjacent the corner posts 51 and abutting the hub portions 53 of said posts at one end and the underside of the support plate 59 at the other end hold said support plate in elevated position. A bed plate 62 having a flat upper surface is secured upon the support plate 59 as by bolts 63.

Removably mounted at the top of the machine framework over the bed plate 62 is a compression chamber unit 64. The compression chamber unit 64 comprises compression chamber member 65, preferably fabricated of stainless steel plate and having flat top and bottom walls 66, 67, respectively, a sloping front wall 68 and perpendicular side walls 69 and 70. The compression chamber member 65 is open at the rear end to provide a shallow rectangular opening 72 slidably fitted within which in close-fitting engagement is a rectangular hollow piston 73, also preferably fabricated of stainless steel plate. A flat synthetic plastic plate 74, preferably of "Nylon" or "Teflon" is fixed against the underside of the bottom wall 67 of the compression chamber member 65 as by machine screw 74a. As best illustrated in FIGS. 4 and 5, generally rectangular, transversely-extending openings 75, 76 are provided in the bottom wall 67 of the compression chamber 65 near the front end thereof and extending through the plate 74 for passage therethrough of the food product to be molded, as is hereinafter described.

As best illustrated in FIGS. 1, 3 and 4, the mounting mechanism for the compression chamber unit 64 comprises angle iron members 77, 78 having vertical flange portions 79, 80, respectively, welded against the outsides of the side walls 69, 70, respectively, of the compression chamber member 65, and outwardly-directed horizontal flange portions 81, 82, respectively, along the undersides of which are welded or otherwise affixed parallel foot bars 83, 84 respectively. The parallel foot bars 83, 84 are spaced apart by approximately the same distance as the top framework members 17 and 21 of the machine framework structure and adapted to rest thereupon. The front ends of the foot bars 83, 84 are recessed at each side to provide central projecting lug portions 85 received in hinge blocks 86 to which they are pivotally connected by transverse pintle bolts 87. The hinge blocks 86 are removably secured to their respective top framework members 17 and 21 as by bolts 88 the heads of which are provided with diametrical bores 89 to receive a metal rod or the like tool facilitating removal of the compression chamber unit 64 from the rest of the machine. The rear ends of the foot bars 83, 84 are vertically drilled to receive bolts 90 for securing them in place against the top framework members 17 and 21. The heads of the bolts 90 are also provided with diametrical bores 91 to receive a tool facilitating their removal and tightening. The bolts 90 are long enough to receive helical compression springs 92 circumjacent thereon between the underside of their heads and top portions of the foot bars 83, 84, whereby the compression chamber unit 64 is yieldably attached with respect to the machine framework.

A flat, rectangular, metal mold plate 93 is slidably mounted in close fitting, face-to-face engagement between the underside of the top of the bed plate 62. Transversely arranged near the front end of the mold plate 93 is a plurality of openings 94 of identical size and shape, round, for example, as in the illustrated embodiment. The openings 94 of the mold plate 93 define the size and shape of the patty to be molded, the thickness being controlled by the thickness of said mold plate. Thus, different mold plates having different thicknesses, and having mold openings varying in size and shape, are utilized to produce the various shapes and sizes of the food patties, sticks and the like desired in use of the machine. As described above, the bed plate 62 can readily be adjusted as to height to accommodate the various thicknesses of mold plates 93 to be used with the machine.

As illustrated in FIGS. 4 and 5, the mold plate 93, at the begining of a molding operation cycle, is located so that its mold shape openings 94 are vertically aligned with the openings 75, 76 in the bottom wall of the compression member 65 for receiving the food to be molded therethrough, as is hereinbelow described.

Mechanism is provided for reciprocating the piston 73 and the mold plate 93 in timed sequence during a cycle of operation of the machine. To this end, the reduced speed output shaft 95 extending from one side of the gear box 42 carries a crank wheel 96 having an eccentric crank pin 97 rotatably journalled on which is one end of a crank shaft 98. The other end of the crank shaft 98 is cylindrical and is slidably fitted in a sleeve bearing 99 secured in diametrically-extending position in a cylindrical rocker shaft 100 (see FIG. 2). The ends of the rocker shaft 100 are journalled in bearing members 101 secured in opposed relation to the inner faces of the intermediate transverse members 16 and 20 of the machine framework, near the rear ends thereof. Welded or otherwise secured to the rocker shaft 100 is a pair of upwardly-extending spaced, parallel actuating rods 102 the outer ends of which are connected to one end each of a pair of adjustable link rods 103. The outer ends of the link rods 103 are journalled to opposite ends of a connector rod 104 secured along the rear edge of the mold plate 93, said connector rod being removably held in place by bolts 105. As illustrated in FIGS. 1 and 4, the connector also journals, at one side, a connecting rod 106 the opposite end of which, through a link 107, actuates an agitator rod 108 having fingers 109a within a hopper 109 removably fitted to the top wall 66 of the compression chamber 65. The hopper 109 has a rectangular bottom opening surrounded by a peripheral cylindrical skirt 110 which fits over a flange 111 secured about a transverse rectangular opening in the top wall 66 of the compression chamber. It will thus be apparent that as the output shaft 95 of gear reduction box 42 rotates, the rocker shaft and its actuating rods 102 will be rocked thereby to reciprocate the mold plate back and forth between the positions illustrated in FIGS. 5 and 7. At the same time, the agitator rod 108 in the hopper will be reciprocated through the action of connecting rod 106 and link 107 to insure the free flow of food to be processed from the hopper into the molding mechanism of the machine.

Referring again to FIGS. 1 and 2, it will be seen that reciprocative action of the piston 73 is controlled by a crank wheel 112 secured to the reduced speed output shaft 95 at the opposite side of the gear box 42. The crank wheel 112 has an eccentric crank pin 113 rotatably journalled on which is one end of a crank shaft 114. The other end of the crank shaft 114 is cylindrical and is slidably fitted in a sleeve bearing 115 secured in diametrically-extending position in a second cylindrical rocker shaft 116. The ends of the second cylindrical rocker shaft 116 are journalled in bearing members 117 secured in opposed relation at central positions along the rear edges of the back upright channel members 12, 14 of the machine framework.

Secured in spaced, aligned relation along the rocker shaft 116 is a pair of bearing members 118 journalled between and through which is a rod 119. Fixed to the outer ends of the rod 119 are one end each of a pair of connector rods 120. The rods 119 are securely interjoined, near the outer ends, by a transverse spacer bar 121. Welded or otherwise securely affixed to the rocker shaft 116 at a central position therealong, and extending upwardly and rearwardly thereof, is an actuating arm 122 the outer end of which is provided with a plurality of longitudinally-extending adjustment holes 123. An adjustable, yieldable override mechanism, generally indicated at 124 in FIG. 1, interconnects the actuating arm 122 and the spacer bar 121. The override mechanism 124 comprises a link rod 125 bifurcated at one end as indicated at 126 in FIG. 2 to pivotally connect with any one, selectively, of the holes 123 of the actuating arm 122 as by a bolt 127, and slidably fitted at the other end in a diametrical bore centrally located along the transverse spacer bar 121. The outer end of the link rod 125 is threaded to receive an adjustable nut 128. Circumjacently arranged on the link rod 125 is a cylindrical spring sleeve 129 housing a helical compression spring 130. The spring sleeve 129 has an annular end wall 132 at its outer end against the inside of which the outer end of the spring 130 abuts. The opposite or inner end of the spring 130 is constrained by an abutment member 131 and adjustably positioned along the link rod 125.

The outer ends of the connector rods 120 are interconnected by a transverse bar 133. Removably linked to the bar 133 at one end is a pair of elongated link members 134 having downwardly-extending lugs members 135 at one end provided with inverted, L-shaped slots 136 within which said bar fits and is held in place by wing bolts 137 (see FIGS. 1, 2 and 6). The other ends of the link members 134, as is best illustrated in FIGS. 4 and 5, are provided with longitudually-adjustable connector end portions 138 the outer ends of which are bifurcated, as indicated at 139, and pivotally connected, as by pins 140, to a pair of transversely aligned lugs 141 welded between the top and bottom walls of the hollow piston 73. It will thus be apparent that as the second cylindrical rocker shaft 116 rocks back and forth under the influence of the crank shaft 114, the connector rods 120, yieldably connected to said rocker shaft through action of the override mechanism 124, will serve to reciprocate the compression member 65 back and forth within the compression member 65 in timed sequence with the reciprocative motion of the mold plate 93, hereinabove described.

Figure 7:
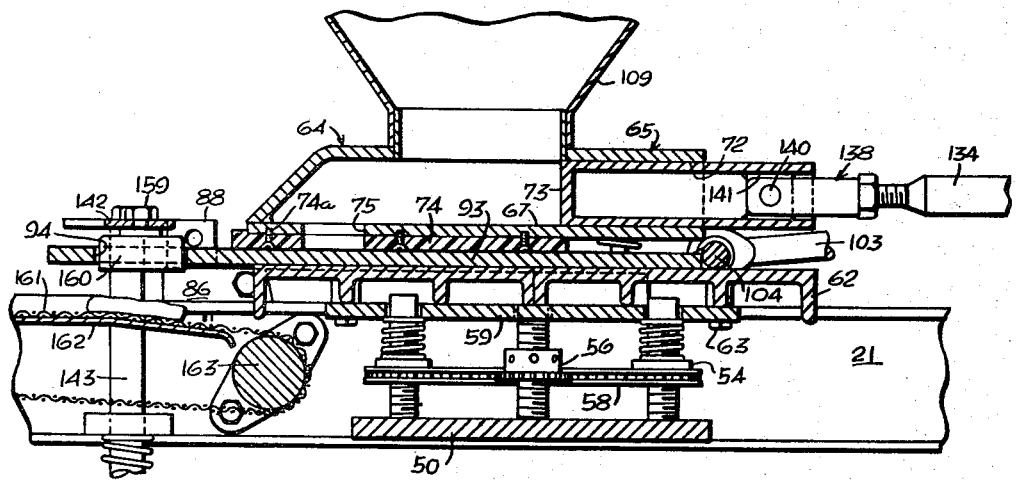
FIG. 7 is a cross-sectional view similar to FIG. 5, but showing the piston in withdrawn position just prior to the compression or molding stroke.

Means is provided for automatically removing the molded patties from the mold plate upon the completion of a molding cycle and when the mold plate is in its forward-most projecting position as illustrated in FIG. 7. To this end, as is best illustrated in FIGS. 3, 4 and 5, a push bar 142 is arranged transversely above the machine in front of the compression chamber unit 64, removably secured at each end upon transversely aligned push rods 143 slidably supported for vertical reciprocal motion in opposed pairs of upper and lower bearing plates 144, 145, respectively, welded or otherwise secured within the top transverse framework members 17, 21 and the intermediate transverse framework members 16, 20. The lower end of each of the push rods 143 is bifurcated to provide a slot journalled within which is a ball bearing roller 156. The rollers 146 ride on the rims of a pair of disc cams 147 fixed on a cam drive shaft 148 journalled between bearing members 149 secured against the rear edges of the front upright channel members 11, 13 of the framework. The disc cams 147 are circular, except for a rounded peripheral depression 150. The push rods 143 are constrained in downwardly abutting relation with respect to their associated disc cams by helical compression springs 151 circumjacent said push rods and confined between the lower surface of the upper bearing plates 144 and collars 152 adjustably fixed along said push rods. The cam drive shaft 148 is provided with a sprocket 153 carrying a chain 154 linked with a sprocket 155 fixed to the output shaft 95 of the speed reduction gear box 42, whereby said drive shaft will be continuously rotated during operation of the machine. The peripheral depression 150 of the disc cams 147 are in transverse registry so that as they rotate, the push rods 143 will move down into said depressions in unison, carrying along the push bar 142, said push bar being adjustably secured to said push rods as by bolts 156 extending through slots 157 in the ends of said push bar. The push bar is provided along its length with a plurality of slots 158 through which bolts 159 extend for adjustably affixing ejector cups 160 along the underside of said push bar. As illustrated in FIGS. 4 and 7, the ejector cups 160 are of the same shape but slightly smaller than the openings 94 in the particular mold plate 93 being used, and in vertical alignment therewith when the mold plate is in its most forward position. The timing of operation of the push bar 142 is such that it moves down from its rest position as illustrated in FIG. 5 to its downward-most position as shown in FIG. 7 during the instant while the mold plate is in its forward-most position, whereby the downwardly-projection edges of ejector cups 160 will contact marginal edge portions of the formed patties in the openings 94 of the mold plate 93 causing them to drop down upon a wide, continuously moving conveyor belt 161, now to be described.

The conveyor belt 161, as illustrated in FIGS. 4 and 5, is preferably of open-work metal rod and link structure, and rides over a skirted pan 162, preferably of sheet stainless steel, removably positioned over the forwardly projecting portions 18, 22 of the top transverse members 17, 21 of the machine framework. The belt 161 is trained at one end over a drive drum 163 journalled between the top transverse members 17, 21 of the framework, and, at the other end, over an idler drum 165 journalled between brackets 164 secured to the outer ends of the forwardly-projecting portions 18, 22 of said top transverse members. The conveyor belt 161 is set in continuous motion during operation of the machine by means of a chain 166 driven by a sprocket 167 on cam drive shaft 148 and driving a sprocket 168 fixed on one end of the conveyor belt drive drum 163. The chain 166, as is best illustrated in FIG. 1, rides over a pair of idler sprockets 169, 170 journalled against the inside of the intermediate transverse member 16 of the framework, to off-set the chain drive from the above-described patty moving mechanism. It will be understood that the conveyor belt 161 is driven at a fast enough speed to carry the ejected rows of patties forwardly of the machine by a sufficient distance to leave space for the next successive row, for delivery to another conveyor or to a table or other automatic machinery for further processing or packing, as may be required.

A salient feature of the invention resides in the fact that the compression chamber unit 64, together with the piston 73 and mold plate 93, and push bar 142, can readily be removed for cleaning, as well being readily adjustable when changing the mold plate for different sizes and shapes of patties. The adjustability of the compressional force imparted by the override mechanism actuating the piston 73, moveover, permits precise control over the compressional force applied to the food product being molded to insure compact and uniform molding and weight control within close limits.

While I have illustrated and described herein only one form in which the invention may conveniently be embodied in practice, it is to be understood that this form is presented by way of example only, and not in a limiting sense. The invention, in brief, comprises all the embodiments and modifications coming within the scope and spirit of the following claims.

What I claim as new and desire to secure by Letters Patent is:

1. A patty molding machine comprising, in combination, a compression chamber, an opening in one end of said chamber defined by an interior wall portion of substantially uniform cross-section, a piston arranged for reciprocal movement within said interior wall portion, communication means in the other end of said chamber for the outward passage of a food product in said chamber to be molded under the influence of the compressional force of said piston during its reciprocation, a bed plate, mechanism for removably and adjustably securing said compression chamber in spaced relation with respect to said bed plate, a flat mold plate slidably arranged between said compression chamber and said bed plate and reciprocable between inner and outer positions with respect thereto, said mold plate having a plurality of through shaping openings in registration with said compression chamber communication means when in said inner position, and outward of said compression chamber when in said outer position, and means for reciprocating said piston and said mold plate in timed sequence wherein said mold plate is moved from said inner position to said outer position while said piston is in its innermost position of reciprocation in said compression chamber, said piston reciprocating means comprising adjustable override mechanism for limiting the compressional force exerted by said piston upon the food product in said chamber.

2. A patty molding machine as defined in claim 1 wherein said override mechanism comprises a helical compression spring.

References Cited
UNITED STATES PATENTS

| | | | |
|---|---|---|---|
| 2,799,044 | 7/1957 | Mahan | 17—32 |
| 3,203,037 | 8/1965 | Anhanger et al. | 17—32 |
| 3,256,557 | 6/1966 | Blake | 17—32 |
| 3,319,285 | 5/1967 | Holly | 17—32 |

LUCIE H. LAUDENSLAGER, *Primary Examiner.*